United States Patent [19]

Iijima

[11] Patent Number: 5,615,381
[45] Date of Patent: Mar. 25, 1997

[54] SECURITY FOR A DATA PROCESSING SYSTEM HAVING MULTIPLE DISTINCT PROGRAM INSTRUCTION SECTIONS

[75] Inventor: Yasuo Iijima, Tokyo, Japan

[73] Assignee: Kabushiki Kaisha Toshiba, Kawasaki, Japan

[21] Appl. No.: 261,029

[22] Filed: Jun. 14, 1994

Related U.S. Application Data

[63] Continuation of Ser. No. 22,431, Feb. 16, 1993, abandoned, which is a continuation of Ser. No. 473,041, Jan. 31, 1990, abandoned.

[30] Foreign Application Priority Data

Feb. 1, 1989 [JP] Japan .................. 1-22967

[51] Int. Cl.$^6$ ...................................... G06F 12/14
[52] U.S. Cl. ........................ 395/800; 395/490; 380/4; 364/232.4; 364/263.2; 364/286.4; 364/DIG. 1
[58] Field of Search ...................... 395/800, 575, 395/425, 375, 835, 490, 186, 733, 828, 856, 479, 438; 380/3, 4

[56] References Cited

U.S. PATENT DOCUMENTS

| 3,803,559 | 4/1974 | Bandoo et al. | 395/425 |
|---|---|---|---|
| 4,211,919 | 7/1980 | Ugon | 235/487 |
| 4,575,621 | 3/1986 | Dreifus | 235/380 |
| 4,584,665 | 4/1986 | Vrielink | 395/575 |
| 4,590,552 | 5/1986 | Guttag et al. | 395/425 |
| 4,713,753 | 12/1987 | Boebert et al. | 395/425 |
| 4,785,166 | 11/1988 | Kushima | 235/441 |
| 4,805,136 | 2/1989 | Morino et al. | 364/706 |
| 4,841,133 | 6/1989 | Gercekci et al. | 235/492 |
| 4,845,351 | 7/1989 | Hara et al. | 235/492 |
| 4,931,993 | 6/1990 | Urushima | 365/189.01 |
| 4,961,142 | 10/1990 | Elliott et al. | 364/408 |
| 5,014,191 | 5/1991 | Padgaonkar et al. | 395/425 |
| 5,047,928 | 9/1991 | Wiedemer | 364/406 |
| 5,067,077 | 11/1991 | Wakimoto et al. | 395/400 |

FOREIGN PATENT DOCUMENTS

| 0109504 | 5/1984 | European Pat. Off. |
|---|---|---|
| 0331407 | 9/1989 | European Pat. Off. |
| 0331202 | 9/1989 | European Pat. Off. |
| 2471004 | 6/1981 | France . |
| 2595485 | 9/1987 | France . |

OTHER PUBLICATIONS

Smart Card Conditional Access Microcomputers Memories, (Motorola) ISO 7816-2 (1988).

Primary Examiner—Alpesh M. Shah
Attorney, Agent, or Firm—Banner & Witcoff, Ltd.

[57] ABSTRACT

An IC card has a CPU and a memory for storing first and second programs. The CPU executes a plurality of instruction in accordance with the first and second programs. The second program is provided by a card manufacturer. A card issuer, such as bank, provides a first program which operates on the second program. The IC card further includes a supervising device for determining when the instructions in the first program address instructions in the second program. When the second program is addressed during operation of the first program, the CPU is interrupted.

9 Claims, 13 Drawing Sheets

FIG. 7

```
            LD    SP, 60FF
1034        LD    A,( A000)
1037        CALL  2000
103A        JP    1000

2000        JP    2010

2010        LD    ( 5000),A
2013        RET
```

FIG. 11

```
            LD    SP, 60FF
1034        LD    A,( A000)
1037        CALL  2000
103A        JP    1000

```
            LD     SP, 60FF
1034        LD     A,( A000)
1037        CALL   2000
103A        JP     1000

```
            LD     SP, 60FF
1034        LD     A,( A000)
1037        CALL   2000
103A        JP     1000

2000        JP     2010

2010        JP     103A
```

SECURITY FOR A DATA PROCESSING SYSTEM HAVING MULTIPLE DISTINCT PROGRAM INSTRUCTION SECTIONS

This application is a continuation of application Ser. No. 08/022,431, filed Feb. 16, 1993, now abandoned, which application is a continuation of application Ser. No. 07/473,041, filed Jan. 31, 1990, now abandoned.

BACKGROUND OF THE INVENTION

1. Field of the Invention

The present invention generally relates to the field of data processing systems, and more particularly is directed to a data processing system with a first program of computer instructions and a second program of computer instructions for prohibiting the first program from using the second program. Specifically, the invention is directed to an IC card with a CPU which operates in accordance with the first program written by a user and a second program written by the card maker for prohibiting program instructions in the first program from directly using program instructions in the second program.

2. Description of the Related Art

An IC card includes a microprocessor within the card as shown in U.S. Pat. No. 4,211,919. An advantage of an IC card is that it may be used to maintain confidential information. For example, no one can access information stored in the IC card without a personal identification number.

A card issuer, such as a bank, would not want the card manufacturer to know the particular application programs used by the bank. Thus, the card maker provides merely a basic operations program resident in the IC card when shipped. The card issuer then provides the application program for his service. Thus, the card manufacturer can supply the same IC card without application programs to a variety of card issuers. It is important for the card maker to maintain the basic operating program and information relating thereto confidential from the card issuer. If the card issuer could determine the structure and nature of the basic operating program, the card issuer could eliminate a need for the card maker.

SUMMARY OF THE INVENTION

Accordingly, it is an object of the present invention to provide a data processing system with a first and a second program for executing instructions in accordance with the first and the second program without jumping from the first program into the second program.

It is another object of the present invention to provide a data processing system having the above as its principle objection, while at the same time being low in cost and easy to manufacture.

It is a still further object of the present invention to provide a data processing system as described above which may be used for a plurality of purposes.

It is a still further object of the present invention to provide a data processing system of the type described above which is embodied on an IC card.

It is a further object of the present invention to provide a data processing system in which selected data within the system may be maintained confidential.

It is a still further object of the present invention to provide a data processing system in which two separate and distinct sections of computer programming instructions are maintained.

It is another object of the present invention to provide a data processing system which is easy to use and to program.

In accordance with the present invention, a data processing system is provided which includes a first memory for storing a first computer program and a second memory for storing a second computer program. Processing means is provided for reading and executing the program stored in the first and second memories. Circuitry also is provided for determining whether computer instructions read from the first or second program by the processor relate to the other of the first or second program and generating an interrupt signal in response to such a determination. When the interrupt signal is generated, the processor is interrupted by the interrupt signal so that further processing is prevented.

BRIEF DESCRIPTION OF THE DRAWINGS

Other objects and many of the attendant advantages of this invention will be readily appreciated as the invention becomes better understood by reference to the following detailed description when considered in connection with the accompanying drawings, in which like reference characters designate the same or similar parts throughout the figures thereof and wherein;

FIG. 7 illustrates an example of a program of computer instructions used in the IC card shown in FIG. 1;

FIG. 11 illustrates a second example of a program of computer instructions used in the IC card shown in FIG. 1;

FIG. 13 illustrates a third example of a program of computer instructions used in the IC card shown in FIG. 1;

FIG. 15 illustrates a fourth example of a program of computer instructions used in the IC card shown in FIG. 1 and;

DESCRIPTION OF THE PREFERRED EMBODIMENTS

An embodiment of an electronic device according to the present invention will be described with reference to the accompanying drawings.

Figure 1:
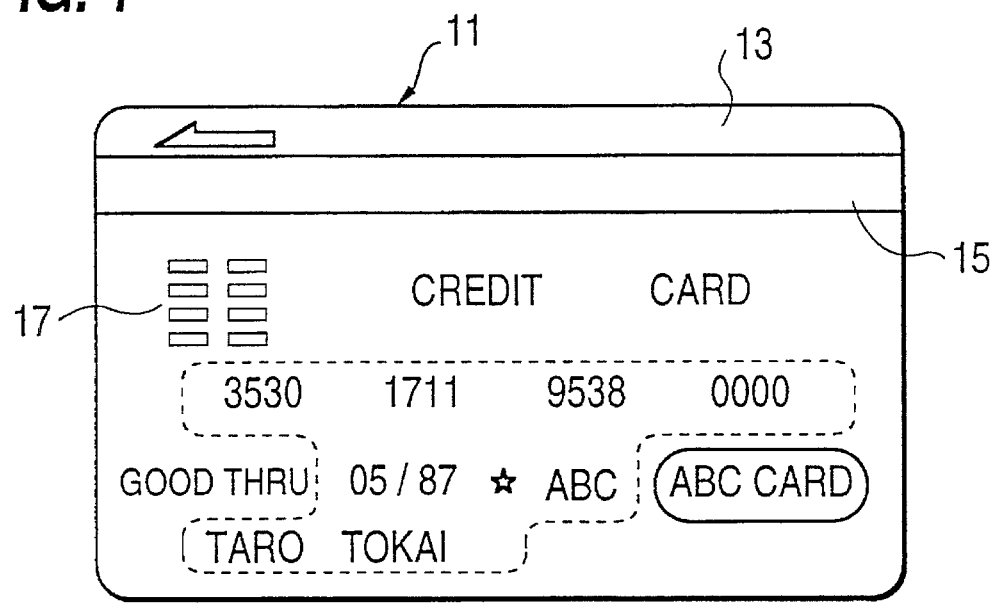
FIG. 1 is a plan view of an IC card according to the present invention.

Referring to FIG. 1, an electronic device, such as an IC card 11, according to the present invention comprises a base 13. Base 13 is rectangular in shape and pocket-size. A magnetic stripe 15, for storing data, is located on base 13. IC card 11 can be used in a conventional magnetic card reader, such as the reader used in a cash dispenser, by reading magnetic stripe 15. IC card 11 includes a contact terminal 17 for electrically connecting IC card 11 with an external device (not shown), such as a reader/writer used in a data network. Information about the card holder and card issuer may be printed or embossed on base 13 as is known in the prior art with respect to a conventional magnetic card.

Figure 2:
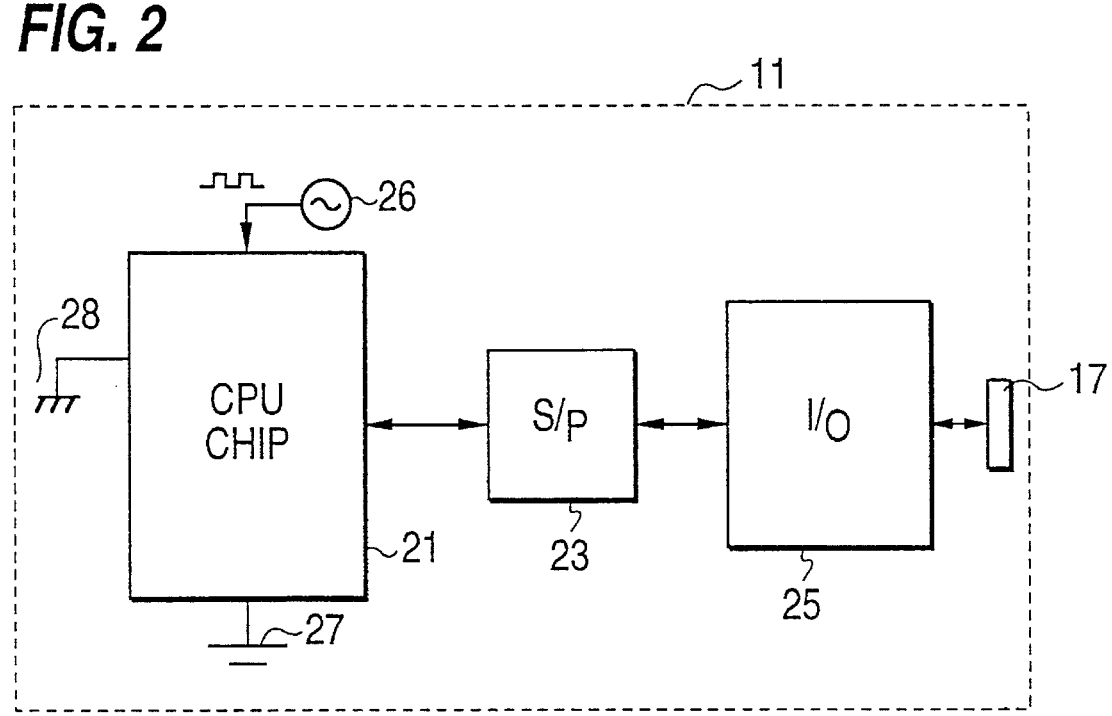
FIG. 2 is a block diagram of the IC shown in FIG. 1.

FIG. 2 shows the inside structure of IC card 11. IC card 11 includes a data processor 21 for performing predetermined transactions in response to a signal input through contact terminal 17. Data processor 21 is coupled to contact terminal 17 through a serial/parallel interface circuit (hereinafter referred to as S/P interface) 23 and an input/output circuit (hereinafter referred to as I/O terminal) 25. The I/O terminal is coupled to contact terminal 17.

Figure 3:
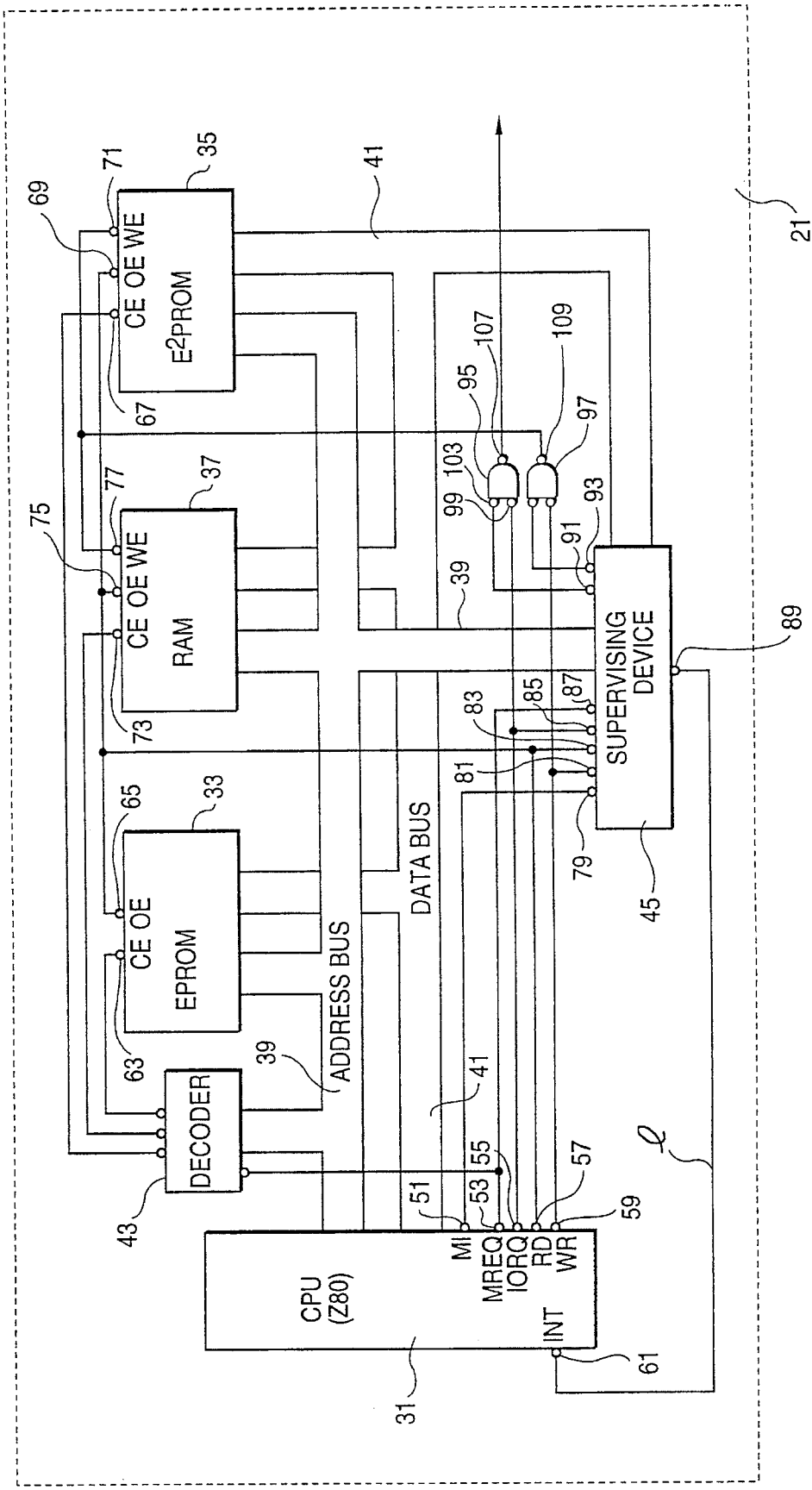
FIG. 3 is a block diagram of a data processor used in the IC card shown in FIG. 2.

With reference to FIG. 3, data processor 21 will be described. Data processor 21 includes a CPU 31 for performing transactions in accordance with a program stored in a first memory, such as Erasable and Programmable Read Only Memory (hereinafter referred to as EPROM) 33. A second memory, such as Erasable and Electrically Programmable Read Only Memory (hereinafter referred to as $E^2PROM$) 35 stores a program made by a card issuer, such as a bank. Data generated in a transaction is temporarily stored in a Random Access Memory (hereafter referred to as RAM) 37. CPU 31 accesses EPROM 33, $E^2PROM$ 35, and RAM 37 through an address bus, such as a sixteen (16)-bit address bus, 39 for sending address data and a data bus, such as an eight (8)-bit data bus 41, for sending data.

If CPU 31 accesses EPROM 33, $E^2PROM$ 35, or RAM, CPU 31 outputs the address data on address bus 39. Decoder 43, which is coupled to the output terminal of address bus 39, receives the address data. Decoder 43 transforms the address data to an enable signal which is sent to either EPROM 33, $E^2PROM$ 35, or RAM 37 in accordance with the address data. EPROM 33, $E^2PROM$ 35, or RAM 37 receives the enable signal and can be accessed by CPU 31. CPU 31 can be prevented from accessing EPROM 33, $E^2PROM$ 35, or RAM 37 if supervising device 45 finds that CPU 31 is attempting to access a predetermined area in EPROM 33, $E^2PROM$ 35, or RAM 37.

In one embodiment, CPU 31 may be a Z80 microprocessor manufactured by Zilog, Inc. (Z80 is a trademark of Zilog, Inc.), and has 6 pins related to signals which are described below and a plurality of pins for the outputs of address bus 39 and data bus 41.

One of the 6 pins is a M1 pin 51 which outputs an M1 signal. When at a low level, the M1 signal indicates that the present machine cycle is the operation code (hereinafter referred to as opcode) fetch cycle of an instruction execution. The opcode fetch cycle is the first machine cycle for executing an instruction.

MREQ pin 53 outputs a Memory Request (hereinafter referred to as MREQ) signal. When at a low level, the MREQ signal indicates that address bus 39 holds valid address data for a memory read or memory write operation.

IORQ pin 55 outputs an Input/Output Request (hereinafter referred to as IORQ) signal. When at a low level, the IORQ signal indicates that the lower half of address bus 39 holds a valid I/O address for an I/O read or write operation. The IORQ signal also is at a low level concurrently with the M1 signal during an interrupt acknowledge cycle, which begins when CPU 31 samples an interrupt signal with the rising edge of the last clock cycle at the end of any instruction.

RD pin 57 outputs a Read (hereinafter referred to as RD) signal. At a low level, the RD signal indicates that CPU 31 wants to read data from EPROM 33, $E^2PROM$ 35, RAM 37, or I/O device 25 (see FIG. 1).

WR pin 59 outputs a Write (hereinafter referred to as WR) signal. At a low level, the WR signal indicates that data bus 41 holds valid data to be stored at the addressed memory or I/O location.

INT pin 61 receives an Interrupt Request (hereinafter referred to as INT) signal. The INT signal is generated by devices other than CPU 31. According to the present embodiment, the INT signal is generated by supervising device 45.

EPROM 33 has a CE pin 63 which receives a Chip Enable (hereinafter CE) signal from decoder 43. At a low level, the CE signal enables EPROM 33 to accept command or data input from CPU 31. EPROM 33 also has an OE pin 65 which receives an output enable (hereinafter referred to as OE) signal from RD pin 57 of CPU 31. When low, the OE signal enables EPROM 33 to output data stored in EPROM 33.

$E^2PROM$ 35 also has a CE pin 67, an OE pin 69 and a WE pin 71.

CE pin 67 receives the CE signal from decoder 43. When low the CE signal enables $E^2PROM$ 35 to accept command or data input from CPU 31. OE pin 69 receives the OE signal from RD pin 57 of CPU 31. When low, the OE signal enables $E^2PROM$ 35 to output data stored in $E^2PROM$ 35. WE pin 71 receives a Write Enable (hereinafter referred to as WE) signal from NAND gate 97. The WE signal, when low, enables $E^2PROM$ 35 to be written into by other devices such as CPU 31.

RAM 37 has a CE pin 73, an OE pin 75 and a WE pin 77. CE pin 73 receives the CE signal from decoder 43. At its low level, the CE signal enables RAM 37 to accept command or data input by CPU 31. OE pin 75 receives the OE signal from RD pin 57 of CPU 31. When at a low level, the OE signal enables RAM 37 to output data stored in RAM. WE pin 77 receives the WE signal from first negative AND gate 97. When at a low level, the WE signal enables RAM 37 to be written into by CPU 31.

Supervising device 45 has first, second, third, fourth and fifth input pins 79, 81, 83, 85 and 87 and first, second and third output pins 89, 91 and 93. Data processor 21 further includes a first and second Negative AND gates 95 and 97.

Address bus 39 of CPU 31 is connected to EPROM 33, $E^2PROM$ 35 and RAM 37, decoder 43 and supervising device 45. Data bus 41 of CPU 31 is connected EPROM 33, $E^2PROM$ 35 and RAM 37 and supervising device 45. M1 pin 51 is connected to first input pin 79 of supervising device 45. MREQ pin 53 is connected to an input pin of decoder 43 and fifth input pin 87 of supervising device 45. IORQ pin 55 is connected to fourth input pin 85 of supervising device 45 and a first input 99 of first negative AND gate 95. A negative AND gate is a logic circuit that produces a signal with low level when two low level signals are input and producing a signal with high level when at least one high level signal is input and is a functional equivalent of an OR gate.

RD pin 57 is connected to third input pin 83 of supervising device 45 and OE pins 65, 69 and 75 of EPROM 33, $E^2PROM$ 35 and RAM 37 respectively. WR pin 59 is connected to input 81 of supervising device 45 and an input 101 of second negative AND gate 97.

First output pin 89 of supervising device 45 is connected to INT pin 61. Second output pin 91 of supervising device 45 is connected to a second input pin 103. Third output pin 93 of supervising device 45 is connected to a first input pin 105 of second negative AND gate 97. An output pin 107 of first negative AND gate 95 is connected to I/O device 25. An output pin 109 is connected to WE pins 71 and 77 of E²PROM 35 and RAM 37.

Three outputs of decoder 43 are connected to CE pins 63, 67 and 73 of EPROM 33, E²PROM 35 and RAM 37 respectively.

CPU 31 places address data on address bus 39. CPU 31 accesses memory corresponding to the address data supplied and then loads an opcode from the memory. CPU 31 decodes the opcode and then executes in accordance with the opcode decoded.

In these operations, decoder 43 selects a memory from among EPROM 33, E²PROM 35 and RAM 37 in accordance with the address data supplied from CPU 31. At the same time, supervising device 45 receives the address data and then determines whether CPU 31 is allowed to access a memory address which is specified by the address data supplied from CPU 31.

Figure 4:
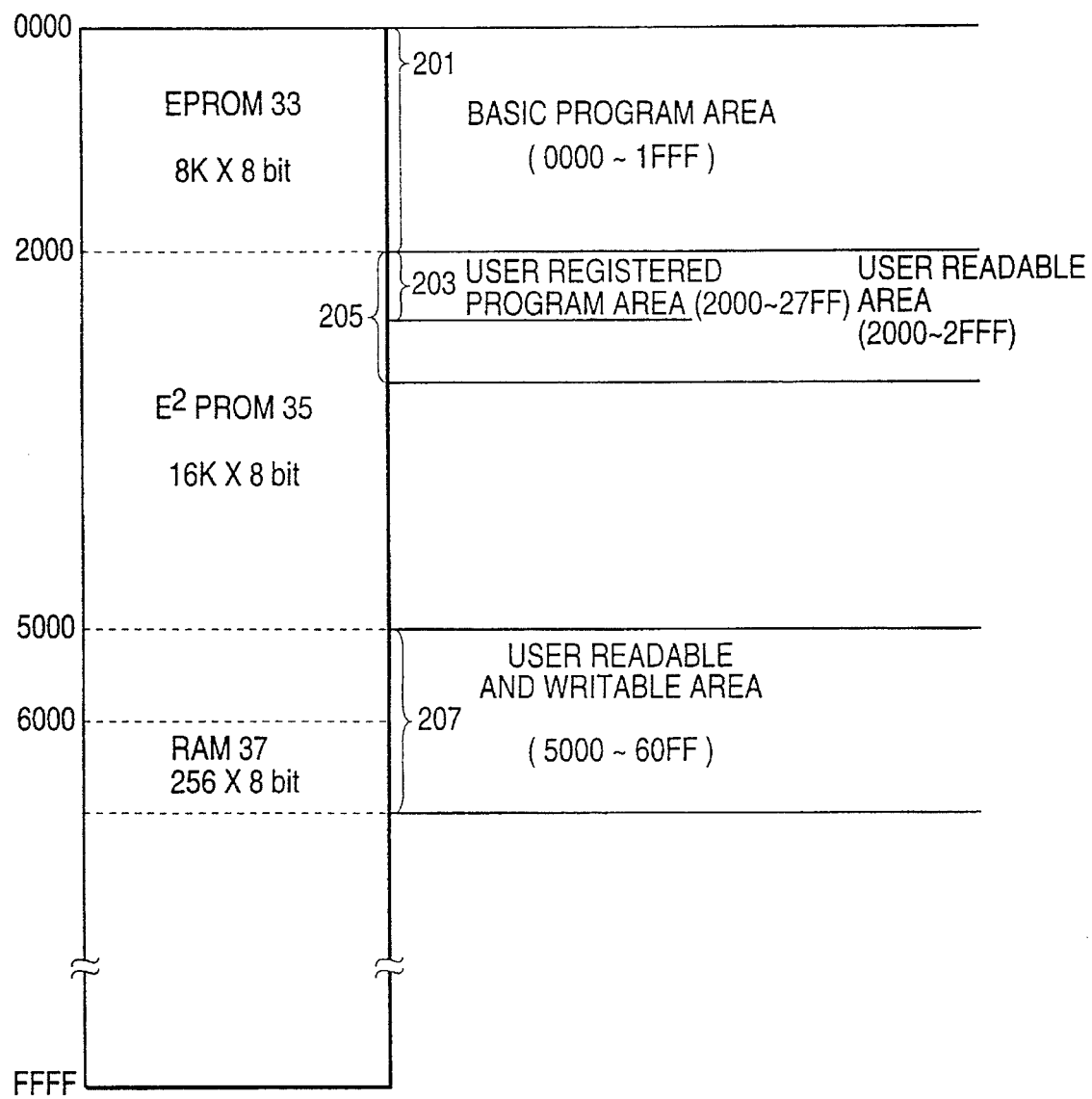
FIG. 4 illustrate the memory configuration used in the data processor shown in FIG. 3.

FIG. 4 depicts the operation of supervising device 45 and how an address is assigned to a plurality of memories, such as EPROM 33, E²PROM 35 and RAM 37.

IC card 11 has two types of programs. One type of program is provided by a card manufacturer. This program (hereinafter referred to as the basic program) defines a basic operation of IC card 21, for example, the process for confirming a personal identification number (hereinafter referred to as PIN).

Another program is provided by a card holder or a card issuer (hereinafter referred to as users, usually a financial institution. Most card issuers want to use IC card 21 for specific services without the control of the card manufacturer. To meet the above demand, a program provided by the user (hereinafter referred to as the user program) may be stored and used in IC card 21.

According to the present embodiment, the system program is stored in a basic program area 201 in a memory space. The basic program area 201 begins at address 0000 (hexadecimal, hereinafter referred to as HEX) and extends to address 1FFF (Hex). The basic program area 201 is located in EPROM 33.

The user program is stored in user registered program area 203 in the memory space. The user registered program area 203 begins at address 2000 (Hex) and extends to address 27FF (Hex) and is located in E²PROM 35.

Information necessary for operating the user program is stored in an user readable area 205 beginning at address 2000 (Hex) and extending to address 27FF (Hex) which includes the user registered program area 203. CPU 31 can only read information stored in the user readable area 205.

Data, which is generated during the operation of the system program and the user program, can be written and read in a user readable and writable area 207 beginning at address 5000 (Hex) and extending to address 60FF (Hex). Addresses from 5000 (Hex) to 5FFF (Hex) correspond to E²PROM 35. Addresses from (Hex) 6000 to 60FF (Hex) correspond to RAM 37. The user readable and writable area 207 is reserved as the working memory for CPU 31.

As described above, IC card 21 has two types of programs. The user program is provided by the card holder or the card issuer. If the user registered program includes steps which branch into the steps included in the basic program, the users can access the basic program. In the worst ease, the user can steal or alter information used in the operation of the basic program.

As described above, the basic program comprises the basic operation of IC card 21 including the steps for checking the PIN. The security of the basic program operation should be guaranteed by the card manufacturers. Persons other than the card manufacturer should not have access to the basic program.

According to the present invention, supervising device 45 prevents CPU 31 from accessing the basic program during the operation of the user program.

Figure 5:
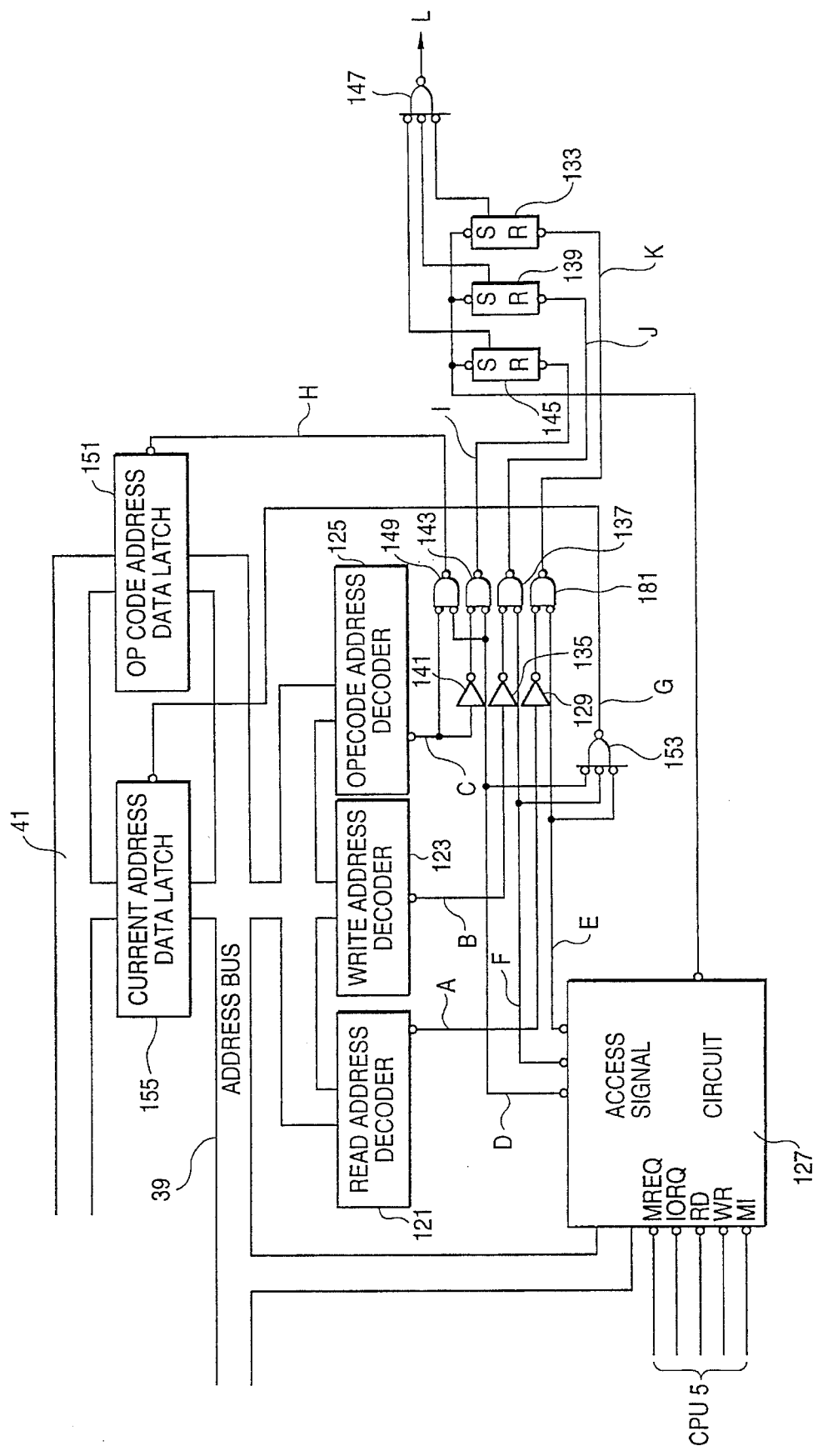
FIG. 5 is a block diagram of a supervising circuit used in the data processor shown in FIG. 3.

FIG. 5, shows the details of supervising device 45. Address bus 39 is coupled to a read address decoder 121 which outputs signal A which goes low when read address decoder 121 detects address data between 2000 (Hex) and 2FFF (Hex). The address area from 2000 (Hex) to 2FFF (Hex) is the user readable area (see FIG. 4).

Address bus 39 also is coupled to a write address decoder 123 which outputs signal B which goes low when write address decoder 123 detects address data between 5000 (Hex) and 60FF (Hex). The address area from 5000 (Hex) and 60FF (Hex) is the user readable and writable area (see FIG. 4).

Address bus 39 is coupled to an opcode address decoder 125 which outputs signal C which goes low when opcode address decoder 125 detects the address data between 2000 (Hex) and 27FF (Hex). The address area from 2000 (Hex) to 27FF (Hex) is the user registered program area (see FIG. 4). For example, when the address data sent on address bus 39 is 2000 (Hex), the signal A and signal C are low and supervising device 45 distinguishes the address data indicating the user registered program area from other areas.

Address bus 39 also is coupled to an access signal circuit 127 which responds to signals from CPU 31, such as the MREQ signal, and generates a signal indicating access by CPU 31 to one of the three memories, such as EPROM 33 and the type of the access by CPU 31, such as opcode access, read access or write access. Opcode access means that CPU 31 accesses one of the three memories to get an opcode stored in the memory. Read access means that CPU 31 accesses one of the three memories to read data stored in the memory. Write access means that CPU 31 accesses one of the three memories to write data in the memory.

When CPU 31 is in opcode access mode, access signal circuit 127 outputs signal D at a low level. When CPU 31 is in the read access made, access signal circuit 127 outputs signal E at a low level. When CPU 31 is in the write access, access signal generating circuit 127 generates a signal F at a low level. The detail of access signal circuit 127 will be explained below.

An output terminal of read address decoder 121, which outputs signal A, is coupled to an input terminal of a first inverter 129 for inverting the level of signal A. An output terminal of first inverter 129 is coupled to a first input terminal of a third negative AND gate 131. An output terminal of third negative AND gate 131 is coupled to a reset terminal of a first flip-flop (hereinafter referred to as F/F) 133.

A second input terminal of third negative AND gate 131 is coupled to a terminal outputting signal E.

An output terminal of write address decoder 123, which outputs signal B, is coupled to an input terminal of a second inverter 135 for inverting the level of signal B. An output terminal of second inverter 135 is coupled to a first input terminal of a fourth negative AND gate 137.

An output terminal of fourth negative AND gate 137 is coupled to a reset terminal of a second F/F 139. A second input terminal of fourth negative AND gate 137 is coupled to a terminal outputting signal F of access signal circuit 127.

An output terminal of opcode address decoder 125, which outputs the signal C, is coupled to an input terminal of a third inverter 141 for inverting the level of signal C. An output terminal of third inverter 141 is coupled to as a first input terminal of a fifth negative AND gate 143. An output terminal of fifth negative AND gate 143 is coupled to a reset terminal of a third F/F 145.

Output terminals of first, second and third F/F 133, 139 and 145 are coupled to a negative OR gate 147 for outputting a low signal when at least one of three inputs is low. Negative OR gate 147 sends a signal L to INT pin 61 of CPU 31.

The output terminal of opcode address decoder 141, which outputs signal C, also is coupled to a first input terminal of sixth negative AND gate 149. A second input terminal of sixth negative AND gate 149 is coupled to a terminal outputting signal D. An output terminal of sixth negative AND gate 149 is coupled to a set terminal of an opcode address data latch circuit 151 for latching address data on address bus 39 in response to an output from sixth Negative AND gate 149. The terminals outputting the signals D, E and F are respectively coupled to three input terminals of a negative OR gate 153. An output terminal of negative OR gate 153 is coupled to a set terminal of current address data latch 155.

Output signals of circuits described above, such as negative OR gate 153, will be explained. The output terminal of negative OR gate 153 output a signal G which is low when at least one of three output signals D, E and F are low. As described above, two low signals D, E or F indicates that CPU 31 is accessing one of the memories, such as EPROM 33. That is, signal G when low, indicates that CPU 31 is accessing one of the memories. Signal G is used as a latch signal for current address data latch 155. When CPU 31 accesses one of the memories, address data on address bus 39 is latched in current address data latch 155.

Signal H output from sixth negative AND gate 147 is low when signals C and D are low. As described above, signal C when low indicates that the present address data supplied on the data bus is located between 2000 (Hex) and 27FF (Hex), which is the user registered program area. Signal D when low, indicates that CPU 31 is in the opcode access made. Signal H when low, indicates that the address data is in the user registered program area when CPU 31 is in the opcode access made. As signal H is used as a latch signal for opcode address data latch 151, address data is latched in opcode address data latch when CPU 31 is in the opcode access made.

Fifth negative AND gate 143 outputs a signal I which is low when signal C is high and signal D is low. Signal C is high when the address data supplied on data bus 39 is out of the user registered program area. Signal D is low when CPU 31 is in the opcode access mode. Signal I is low when CPU 31 is in the opcode access mode to an area other than the user registered program area, such as the system program area in the present embodiment. As signal I is used as the reset signal for third latch circuit 145, third latch circuit 145 is reset when CPU 31 is in the opcode access mode to an area other than the user registered program area.

Fourth negative AND gate 137 outputs a signal J which is low when signal B is high and signal F is low. Signal B when high, indicates that address data supplied on data bus 39 is present.

Third negative AND gate 131 outputs a signal K which is low when signal A is high and signal E is low. Signal A is high when the address data supplied on data bus 39 is out of the user registered area and the user readable and writable area. Signal E is low when CPU 31 is in the read access mode. Signal K is low when CPU 31 is in the read access mode to an area out of the user registered area and the user readable area between 5000 and 60FF, which is the user readable and writable area. Signal F is low when CPU 31 is in the write access mode. Signal J is low when CPU 31 is in the write access mode to an area out of the user readable and writable area. Signal J is used as a reset signal for second latch circuit 139. Second latch circuit 139 is reset when CPU 31 is in the write access mode to an area out of the user readable and writable area. As signal K is supplied to the reset terminal of first latch circuit 133, first latch circuit 133 is reset when CPU 31 is in the read access mode to a memory area out of the user registered area and the user readable and writable area.

Figure 6:
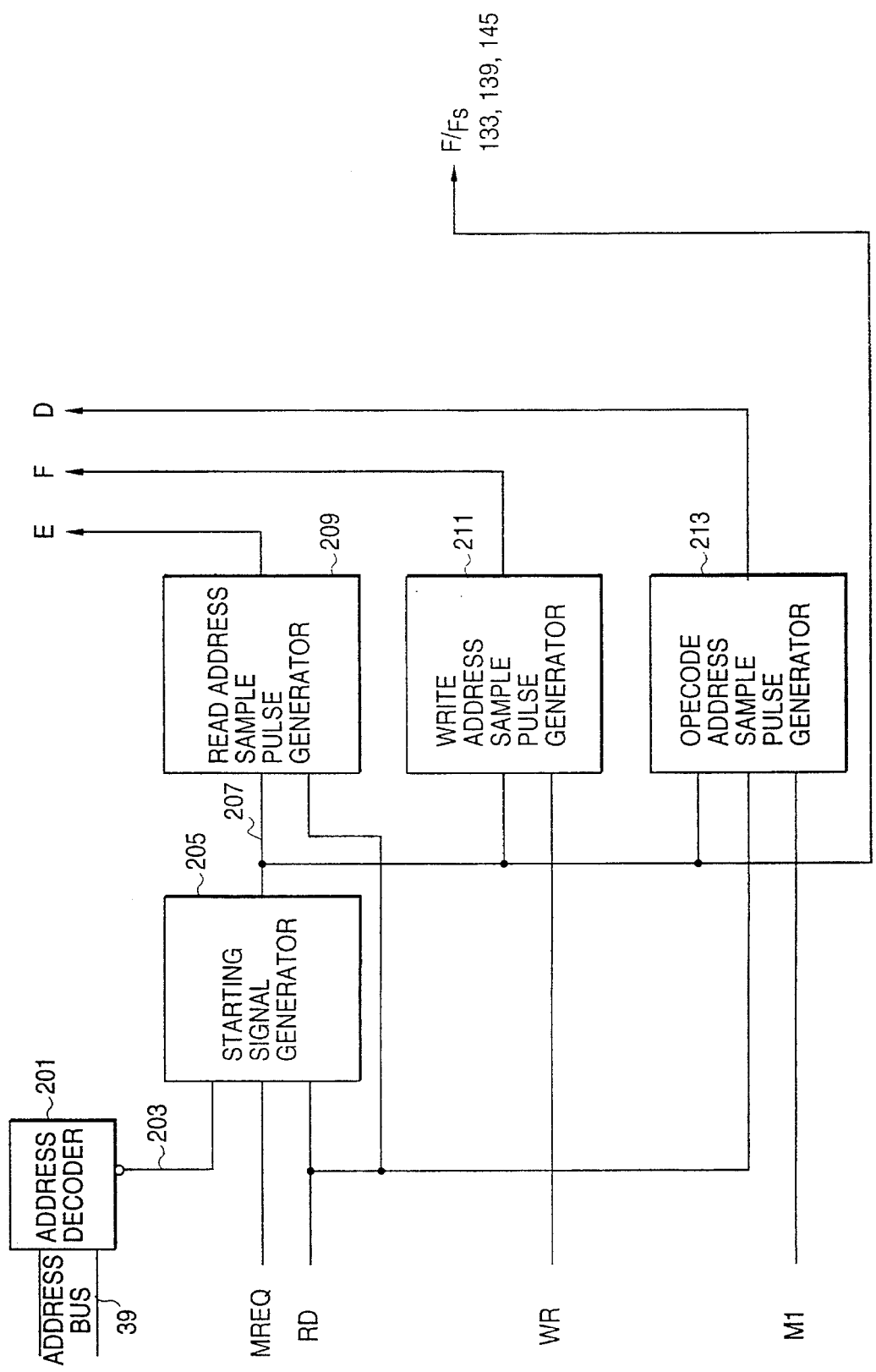
FIG. 6 is a block diagram of an access signal generating circuit used in the supervising circuit shown in FIG. 5.

Referring now to FIG. 6, in conjunction with FIG. 5, address bus 39 is coupled to an address decoder 201 for generating a signal 203 which is low when address decoder 201 detects when the address data supplied is A000 (Hex). According to the present embodiment, a read instruction for reading data from address A000 (Hex) is located in the basic program. The user program follows the basic program, that is, the read instruction for reading data from address A000 (Hex) is performed before execution of the user program.

Signal 203, MREQ signal and RD signal are input to a starting signal generator 205 for generating a starting signal 207 when all inputs are low. When the address data supplied on the data bus is A000 (Hex), address bus 39 holds valid address data, CPU 31 is in the read access mode and starting signal 207 is low.

An output terminal of starting signal generator 205 is coupled to the three set terminals of first, second and third F/Fs 133, 139 and 145.

F/Fs 133, 139 and 145 are set when address A000 (Hex) is detected and CPU 31 is in a state able to access one of the memories.

The output terminals of starting signal generator 205 and the RD signal are respectively coupled to input terminals of a read address sample pulse generator 209 for generating a signal E which is low when starting signal 207 and signal RD is low.

The output terminals of starting signal generator 205 and signal WR are respectively coupled to input terminals of a write address sample pulse generator 211 for generating a signal F which is at a low level when starting signal 207 and WR signal are low.

The output terminals of starting signal 207, RD signal and M1 signal are respectively coupled to input terminals of an opcode address sample pulse generator 213 for generating a signal Y which is low when starting signal 207, RD signal and M1 signal are low.

Figure 8:
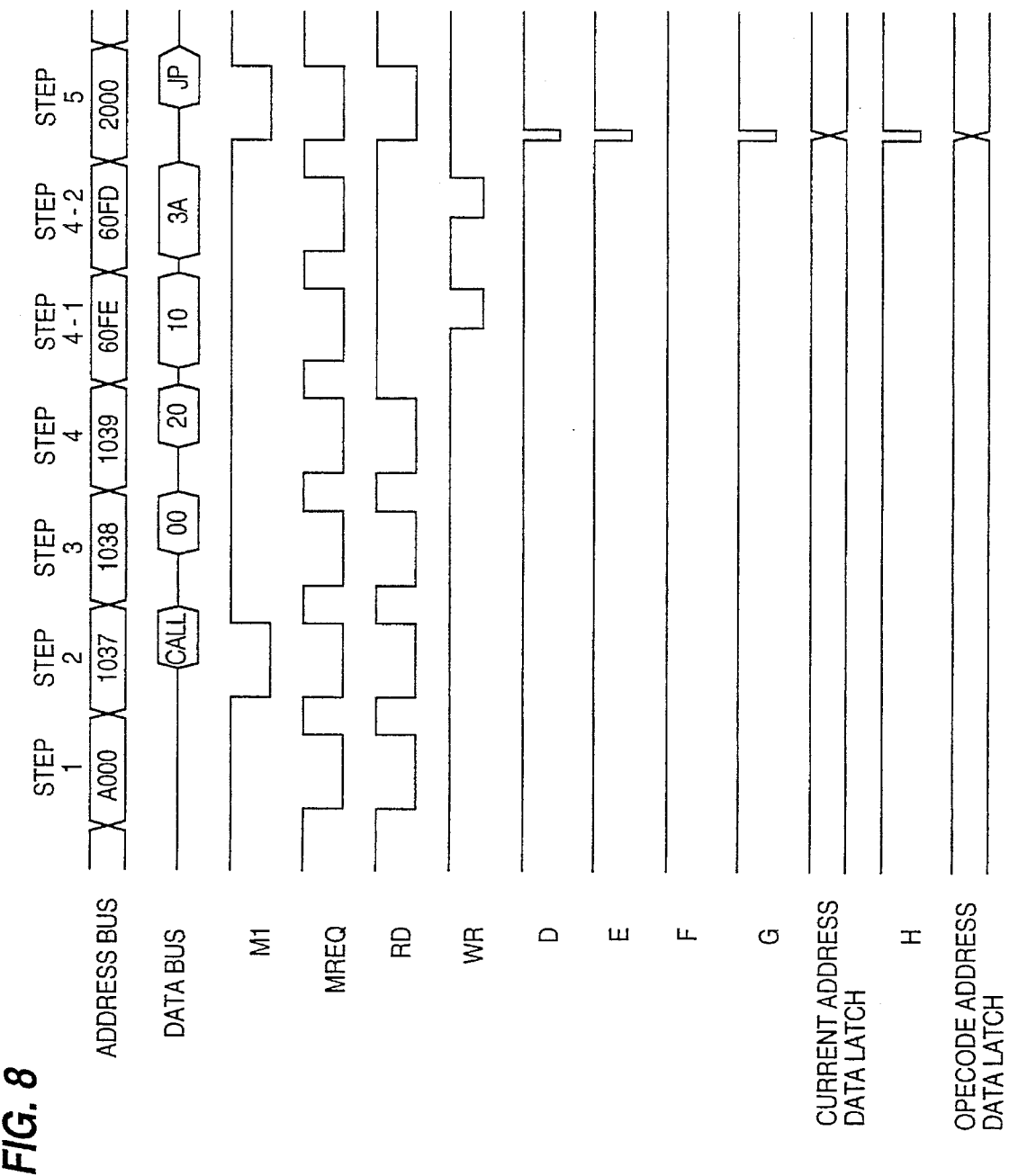
FIGS. 8 and 9 show the waveforms of signals generated by the CPU shown in FIG. 3 operating in accordance with the program shown in FIG. 7.

FIGS. 7 and 8 show an example of the basic and user program ceding. This example of the basic and user program coding illustrates a case where the user program coding includes a step for branching into the basic program coding. A program between 1034 (Hex) and 103A (Hex) is the basic program. A program between 2000 (Hex) and 2013 (Hex) is the user program which is supervised by supervising device 45.

For the reasons of explanation only, the basic and user program coding begins with the instruction "LD A, (A000)".

At first, CPU 31 executes the opcode fetch cycle or the M1 cycle, That is, CPU 31 sends address data 1034 (Hex) onto the address bus. At the same time, CPU 31 makes signal M1 low in order to indicate that CPU 31 is in the opcode fetch cycle. CPU 31 then makes the MREQ signal and RD signal low. RD signal when low indicates that data stored in memories can be enabled onto data bus 41. CPU 31 then accesses the memory in accordance with the address data and fetches opcode LD on the data bus.

After opcode LD is fetched, the data A000 (Hex) is supplied on data bus 41. In FIG. 7, "A" between LD and A000 (Hex) means a register inside CPU 31 which receives this data. On the next clock pulse, CPU 31 sends the address data A000 (Hex) onto address bus 39. The address data A000 (Hex) is supplied to address decoder 201 in supervising device 45. As described above, address decoder 201 makes signal 203 low. After the address data A000 (Hex) is sent, CPU 31 makes the MREQ and RD signals low. In response to signal 203, MREQ and RD signals, starting signal generator 205 generates signal 207. Signal 205 set three F/Fs 133, 139 and 145. From this point, supervising device 45 can supervise the user program.

Address data A000 (Hex) is supplied to decoder 43 in the data processor (See FIG. 3). Decoder 43 does not generate a CE signal because no memory is assigned to address data A000 (Hex). Thus, data bus 41 is floating.

The step in which address data A000 (Hex) is put on address bus 39 and MREQ and RD signals are in a low level is referred to as step 1 as shown in FIG. 8. The machine cycle is hereinafter referred to as a step. Step 1 is the machine cycle for setting F/Fs 133, 137 and 145 in supervising device 45 as described above.

In Step 2 CPU 31 executes the opcode fetch operation and sends address data 1037 (Hex) from a program pointer (not shown) to address bus 39. CPU 32 then makes M1, MREQ, and RD signals low. Decoder 43 in data processor 21 generates a chip selecting signal in accordance with the address data 1037 (Hex). Decoder 43 selects EPROM 33 by supplying the chip selecting signal to EPROM 33.

If reset and signal L are high, step 2 will not be interrupted. This is because signal L is high and the low signal will not be input to INT pin 61 in CPU 31.

In step 3, CPU 31 reads the data following the opcode "CALL" stored in EPROM 33. That is, CPU 31 sends the address data 1038 (Hex) from the program counter which automatically increments the address data stored therein.

When the MREQ and RD signals are low, access signal circuit 127 makes signals D and E low. For the address data 1038 (Hex), read, write and opcode address decoder 12, 123, and 125 make signals A, B and C high. Signals H, I, J and K are high.

In response to a low signal G, current address data latch 155 latches address data 1037 on address bus 39. In response to signals I, J and K, F/Fs 133, 139 and 165 are not affected.

In response to the address data 1038 (Hex), decoder 43 (See FIG. 3) selects EPROM 33 by supplying the CE signal. EPROM 33 sends the lower 8 bits of data, 00 (Hex) onto data bus 41. As in the previous machine cycle supervising device 45 does not make signal L low, and CPU 31 is not interrupted. CPU 31 takes the lower 8 bit data into the register therein.

In step 4, CPU 31 reads the upper bit data 20 (Hex) following the opcode "CALL". The procedures are the same as those in step 3. CPU 31 gets the address data indicating a destination address for branching.

After step 4, CPU 31 stores the address data to which CPU 31 is to return.

In step 4-1, CPU 31 writes the higher 8 bits of data, which are stored in the program counter in the address SP-1. SP indicates the data is stored in the stack pointer. In step 4-1, SP indicates 60FF (Hex). Thus, CPU 31 writes 10 (Hex) into address 60FE (Hex). Note that the data stored in the program counter is incremented after the program counter sends the data at the beginning of step 4.

In step 4-2, CPU 31 writes the lower 8 bits of data, which is stored in the program counter in address SP-2. CPU 31 writes the data 3A (Hex) in the address 60FD (Hex). CPU 31 then changes the content of the stack pointer, i.e., and data (60FF-2) (Hex) is substituted for the data (60FF) (Hex).

CPU 31 performs the instruction in steps 5 and 6. In step 5, CPU 31 is in the opcode fetch cycle. That is, CPU 31 makes M1, MREQ and RD signals low. In response to signals M1 and RD, signals D and E are low.

CPU 31 sends the address data 2000 (Hex) onto address bus 39 before sending M1, MREQ and RD signals. In response to the address data 2000 (Hex), read and opcode address decoders 121 and 125 make signals A and C low. In response to low signals A, C, D and E, signals G and H are low. In response to low signal G, current address data latch 155 latches the data on address bus 39. In response to low signal H, opcode address data latch 151 latches the data on address bus 39.

In step 6, CPU 31 reads the lower 8 bits of data of the data following the opcode "JP" stored in E²PROM. CPU 31 makes RD signal low. In response to low RD signal, signal E is low. Low signal E makes only signal G low. Signal H is high. Thus, current address data latch 155 latches the data 2001 (Hex) on address bus 39. Since signal H is high, opcode address data latch 151 fails to latch the new data and holds the old data 2000 (Hex).

In step 7, CPU 31 reads the upper 8 bits of data of the data following the opcode "JP", 20 (Hex). As in step 6, current address data latch 155 latches the new data 2002 (Hex) on the address bus. Opcode address data latch 151 holds the old data 2000 (Hex). CPU 31 gets the opcode and the address data "JP 2010 (Hex)". The address data 2010 (Hex) is stored in the program counter.

In step 8, CPU 31 jumps to address 2010 (Hex). The instruction in accordance with the address 2010 (Hex) is "LD (5000), A", which indicates that the data stored in a register (not shown) in CPU 31 is sent to memory in accordance with the address 5000 (Hex). In order to perform the above instruction, the data stored in the program counter is sent on address bus 39. Step 8 is the beginning of the machine cycle. Thus, CPU 31 makes M1, MREQ, and RD signals low. The following steps are performed as those in step 5. In steps 9 and 10, the data following the opcode "LD" is read as the same as steps 6 and 7. CPU 31 gets the information about the destination to which CPU 31 sends the data stored in the register.

In step 11, CPU 31 sends the data stored in the register to the address 5000 (Hex). This operation is the writing operation. CPU 31 makes the WR signal low after sending the data 5000 (Hex) onto address bus 39. CPU 31 then makes the MREQ signal low and sends the data to be written onto data bus 41. After data bus 41 is established, CPU 31 makes the WR signal low. In response to the WR signal and the CE signal from decoder 43, the data B from CPU 31 is written in E²PROM 35.

In step 12, CPU 31 sends data 2013 (Hex), which is generated by the program counter, onto the address bus 39.

CPU 31 then operates in accordance with the address data 2013 (Hex). As in step 5, CPU 31 makes the M1 signal low for beginning the new machine cycle. From E²PROM 35, CPU 31 gets the opcode "RET", which indicates a return instruction. CPU 31 goes back to the operation in accordance with the address data stored in the stack pointer. In order to go back, CPU 31 reads the address of the stack pointer and gets the data stored in the stack in accordance with the address stored in the stack pointer.

The stack pointer presently holds the data 60FD (Hex) from step 4-2. The data 60FD (hex) held by the stack pointer is sent to the program counter. CPU 31 sends the data 60FD (Hex) onto address bus 39. CPU 31 makes the RD signal low. In response to the RD signal and the address data 60FD (Hex), CPU 31 gets the low 8 bits of the return address 3A (Hex) stored in the address 60FD (Hex) in step 12-1. In step 12-2, CPU 31 gets the upper 8 bits of the return address 10 (Hex) stored in the address 60FE (Hex). CPU 31 gets all the data of the return address 103A (Hex). The contents of the stack pointer are set to 60FF (Hex).

In step 13, CPU 31 operates in accordance with the address data 103A (Hex) and goes to the opcode fetch cycle. At first, CPU 31 sends the address data 103A (Hex) which is stored in the program counter sent from the stack before this step. CPU 31 makes M1, MREQ, and RD signals low. In response to M1, MREQ, and RD signals and the address data 103A (Hex), CPU 31 tries to access the memory.

At this point, access signal generating circuit 127 in supervising device 45 makes signals D and E low. In response to the address data 103A (Hex), read, write and opcode address decoders 121,123 and 125 leaves signals A, B and C as they are, i.e., at a high level. In response to signals C and D, negative AND gate 143 makes signal I low. In response to signals A and C, negative AND gate 131 makes signal K low. In response to low signals I and K, first and third F/Fs 133 and 145 are reset so that the contents of F/Fs 133 and 145 are low. In response to the content of F/Fs 13 and 145, negative OR gate 147 makes signal L low. Signal L is input to INT pin 61 of CPU 31 so that CPU 31 is interrupted.

At the above step, signal G is made low in response to low signals D and E. Current address data latch 155 latches the address data on address bus 39 in response to a low signal G. Signal H remains high in response to a high signal C and a low signal D. Thus, opcode address data latch 151 fails to latch the address data on address bus 39 and holds the data.

Figure 10:
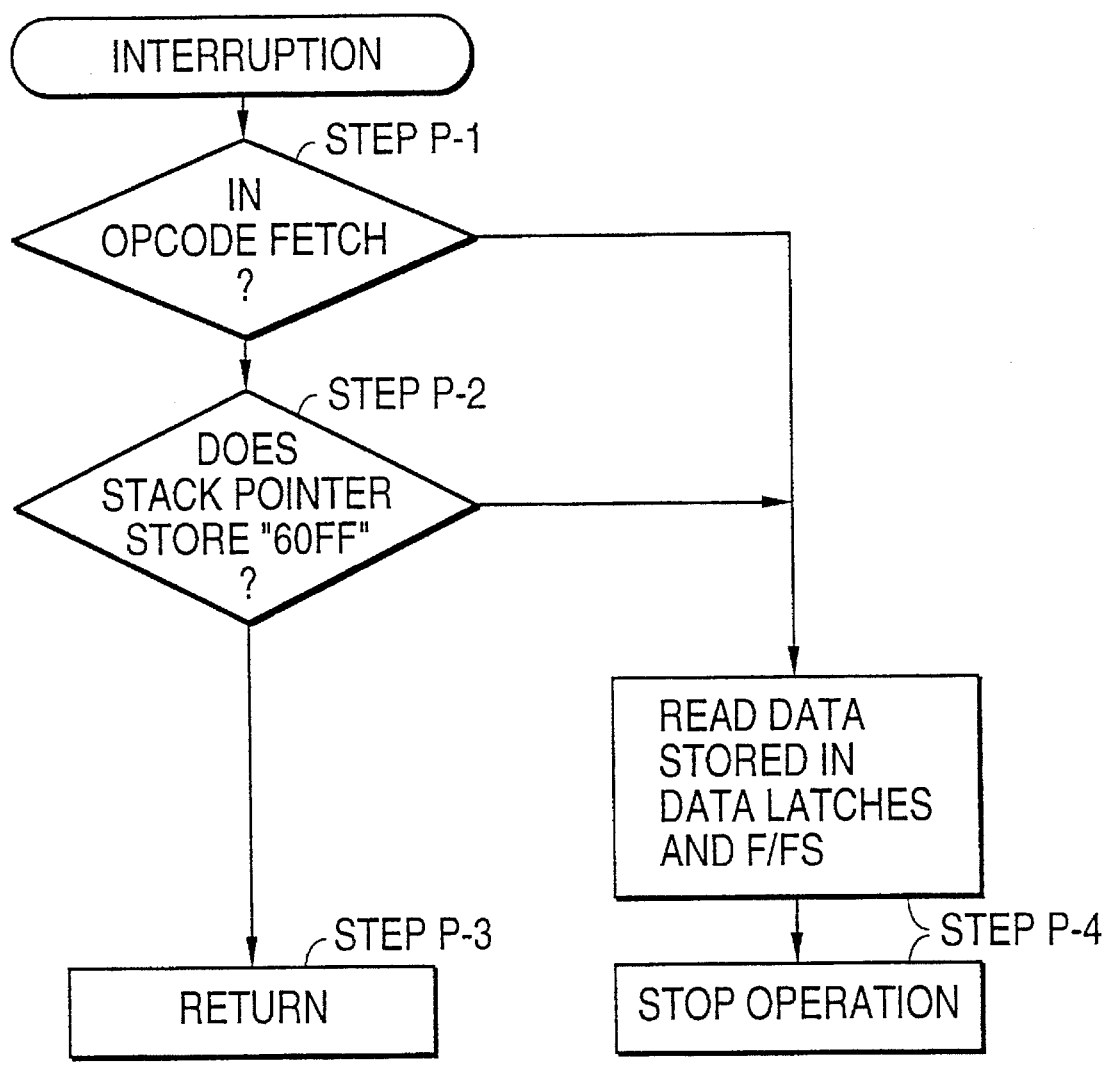
FIG. 10 is a flow chart illustrating the operation of the CPU, shown in FIG. 3 after the data processor is interrupted.

Referring now to FIG. 10, the interrupt routine will be explained. In response to low signal L, CPU 31 operates in accordance with the interrupt program. In step P-1, CPU 31 detects whether or not CPU 31 operated in the opcode fetch in interrupting. In order to detect above. CPU 31 cheeks the contents of F/Fs 133, 139 and 145. As described above, low signal I resets F/F 145 and is generated when CPU 31 attempts to access an address area other than the address data from 2000 (Hex) to 27FF (Hex) under the opcode fetch. Low signal J resets F/F 139 and is generated when CPU 31 attempts to access an address area other than the address data from 5000 (Hex) to 60FF (Hex) in the write mode. Low signal K resets F/F 133 and is generated when CPU 31 attempts to access an address area other than the address data from 2000 (Hex) to 2FFF (Hex) or from 5000 (Hex) to 60 FF (Hex) in the read mode.

If CPU 31 is in the opcode fetch mode, CPU 31 then detects whether or not the stack pointer stores the address data 60FA (Hex) in step P-2. If the stack pointer stores the data 60 FD, CPU 31 returns the application program as shown in FIG. 7 in step P-3.

If CPU 31 fails to be in the opcode fetch mode in step P-1, or if the stack pointer fails to store 60FD (Hex) in step P-2. CPU 31 determines that the application program has failed. CPU 31 stops the operation in accordance with the application program after the CPU 31 reads and stores the data from F/F 133, 139 and 145 and current and opcode address data latches 151 and 155 in step P-4. This data is used for analyzing the interruption.

Figure 9:
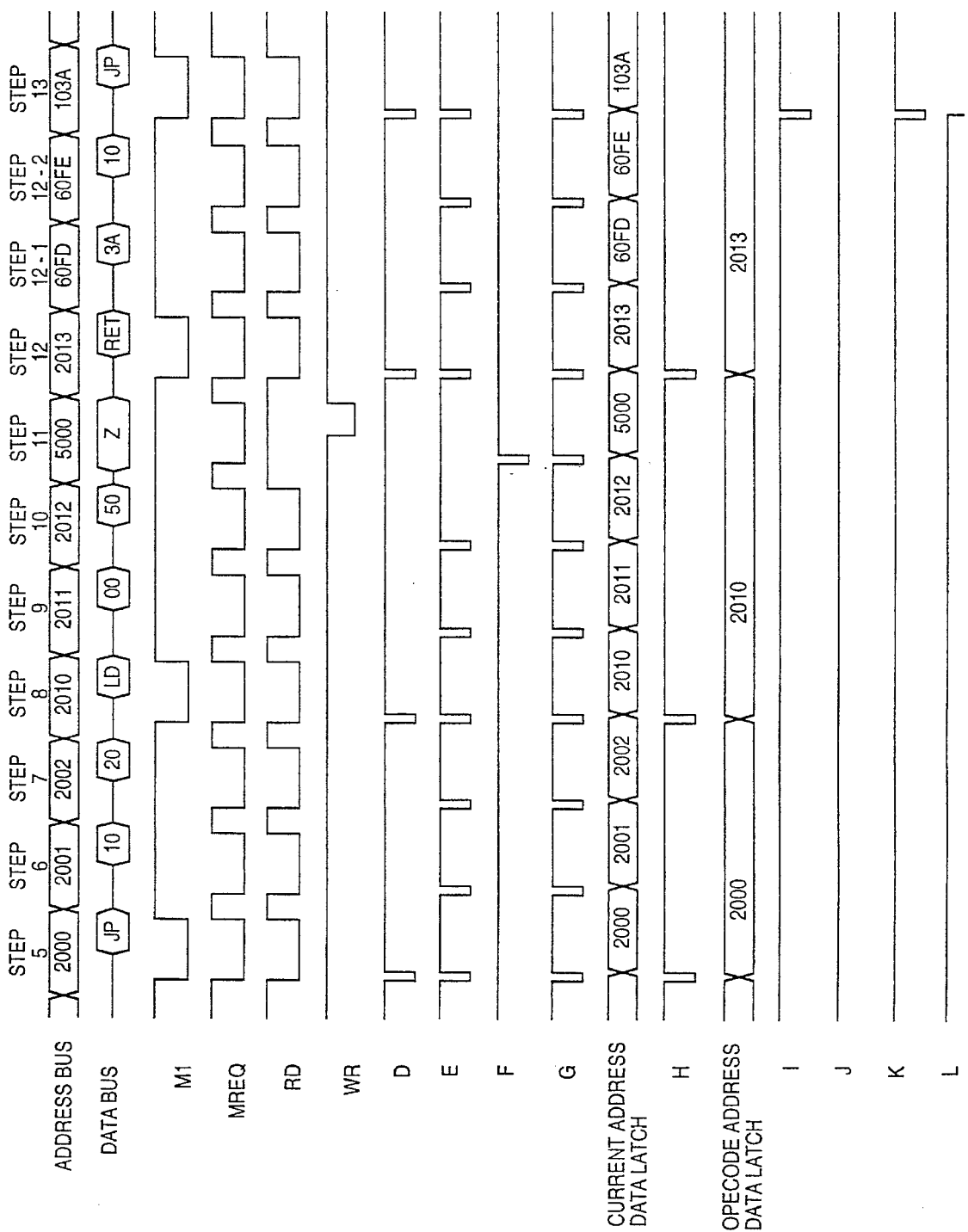

According to the program coding shown in FIG. 7, when CPU 31 is interrupted, i.e., step 13 shown in FIG. 9, M1 signal is low. This indicates that CPU 31 is in the opcode fetch mode.

The stack pointer stores the data 60FD (Hex) when the interruption takes places. This is because the operation of the interruption causes the contents of the stack pointer to be decremented by two (Hex). As described above in step 12-2 performed before the interruption, the stack pointer stores the data 60FF (Hex). Thus, the stack pointer stores the data 60FD (Hex).

Figure 12:
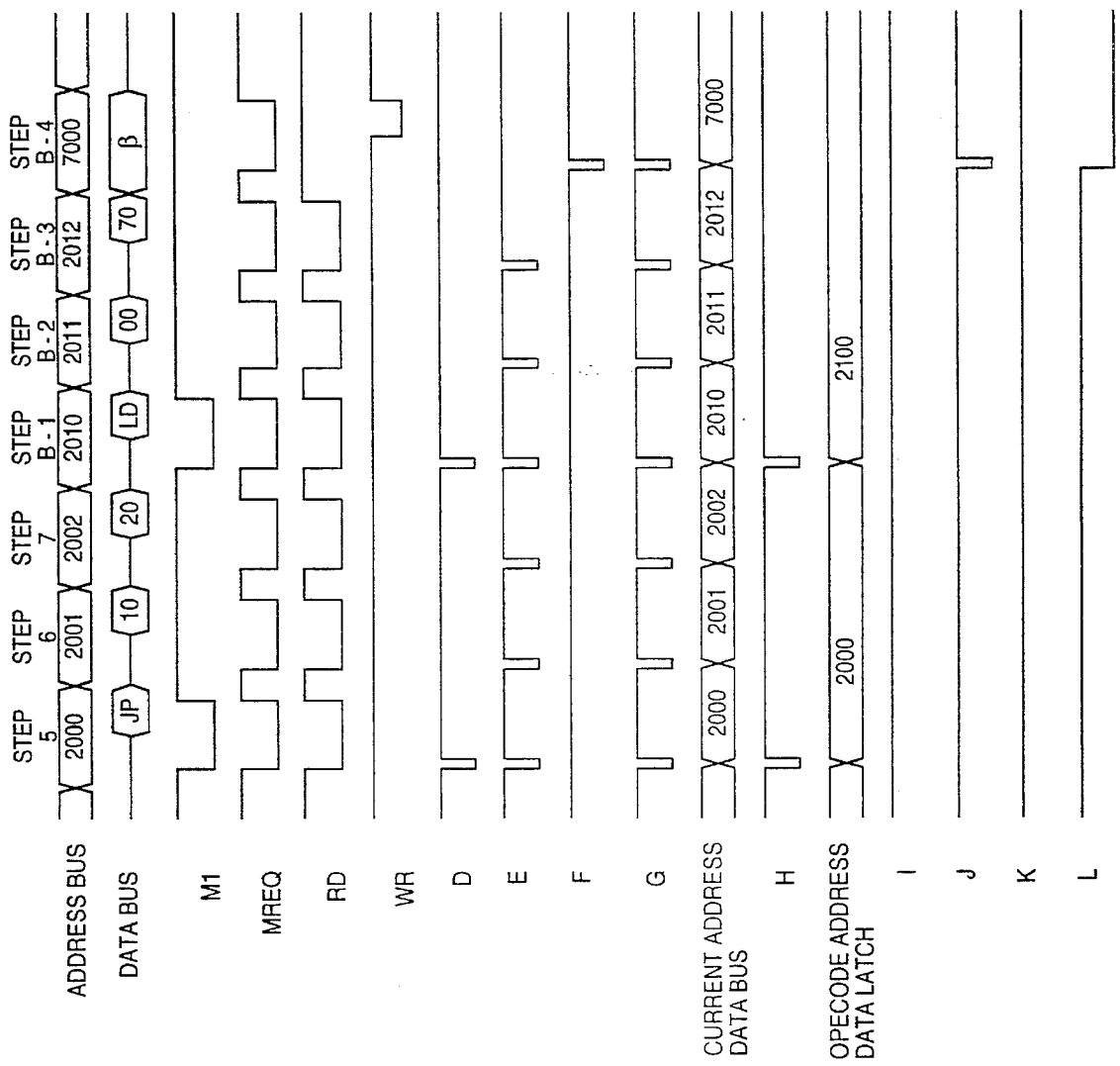
FIG. 12 show the waveform of signals generated by the CPU shown in FIG. 3 operating in accordance with the program shown in FIG. 11.

Referring now to FIGS. 11 and 12, a second example of the user program coding is explained. In the second program coding, CPU 31 attempts to perform a write instruction in an address outside of the user readable and writable area.

CPU 31 performs the same instructions as those in the first example of the user program coding shown in FIG. 7. In step B-1 after step 7, CPU 31 moves into the opcode fetch cycle and makes M1, MREQ, and RD signals low in order to fetch the opcode stored in the memory in accordance with the address data 2010 (Hex). In response to low MI, MREQ, and RD signals and the address data 2010 (Hex), CPU 31 gets the opcode "LD".

In step B-2 after step 2-1, CPU 31 reads the lower 8 bits of the address data following the opcode "LD". In step B-3, CPU 31 reads the upper 8 bits 70 (Hex) of the address data following the opcode "LD". At this step, CPU 31 gets the information where the data is stored.

In step B-4, CPU 31 moves into the write operation and sends the address 7000 (Hex) onto address bus 39. CPU 31 makes MREQ and WR signals low.

In response to WR signal, write address sample pulse generator 211 makes signal F low. Signals D and E remain high.

In response to the address data 7000 (Hex), read, write and opcode address decoders 121, 123 and 125 make signals A, B and C high.

In response to a high signal B and a low signal F, negative AND gate 137 makes signal J low. Signals I and K remain high. In response to signal J, F/F 139 is reset and the contents of F/F 139 (high) is input to negative OR gate 147. In response to the output of F/F 139, negative OR gate 147 makes signal L low so that CPU 31 is interrupted.

After CPU 31 is interrupted, CPU 31 operates under the interrupting routine shown in FIG. 10. According to the present program coding, CPU 31 operates in the writing mode when the interruption takes place. Thus, CPU 31 performs step P-4 shown in FIG. 10.

Figure 14:
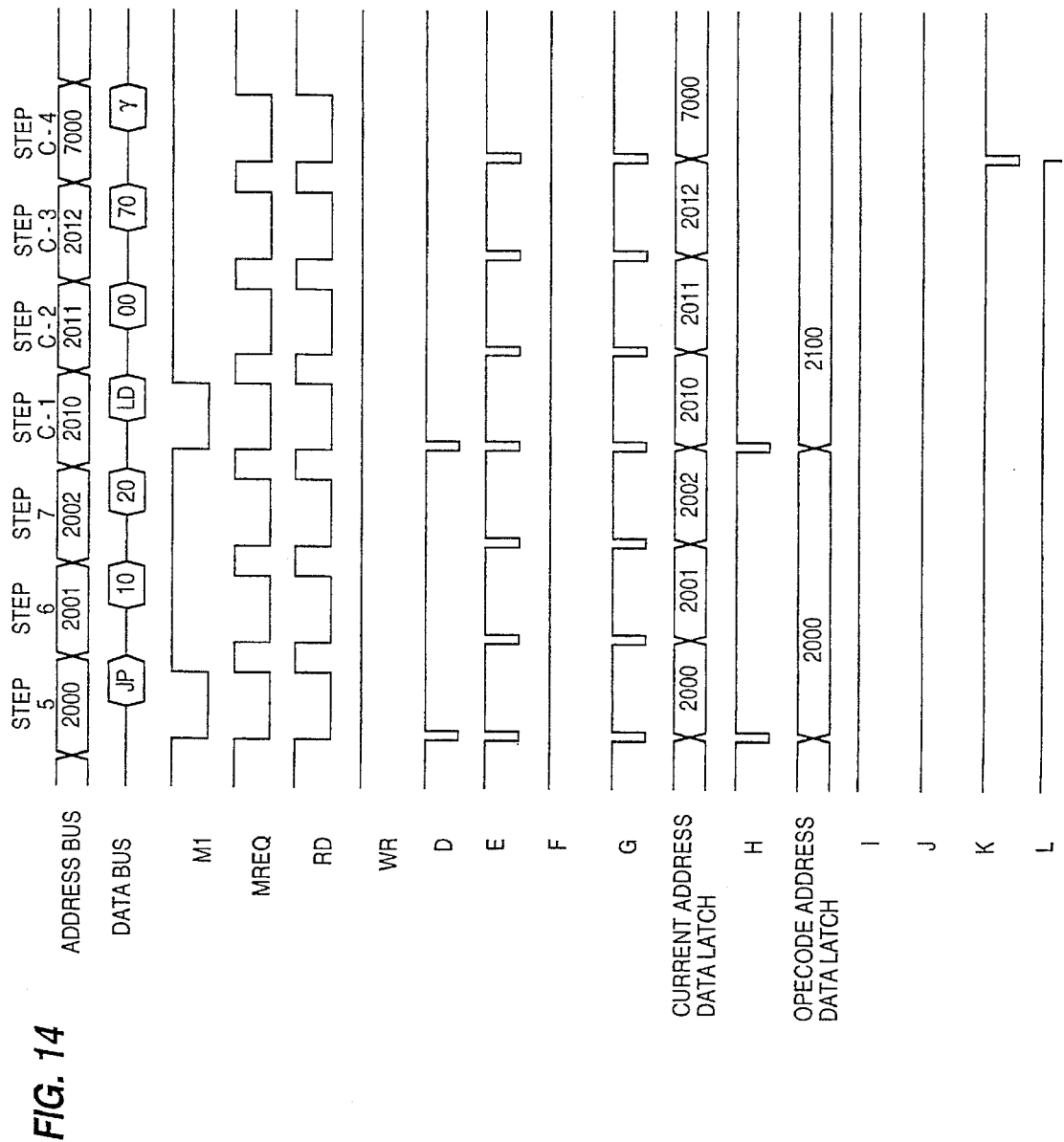
FIG. 14 shows the waveform of signals generated by the CPU shown in FIG. 3 operating in accordance with the program shown in FIG. 13.

Referring now to FIGS. 13 and 14, a third example of the user program coding is explained. The third program coding includes steps to write data to an address located outside of the user readable and writable area.

The difference between the first and third program coding is step 2010. Step 2010 in the third program coding is "LD A, (7000 (Hex))", the read operation. CPU 31 reads the opcode "LD" and the address data of lower 8 bits "00" and higher 8 bits "70" through steps C-1, C-2, and C-3, which are the rough equivalent of steps B-1, B-2 and B-3.

In step 2-4, CPU 31 moves into read execution. That is, CPU 31 sends the address data "7000 (Hex)" and makes MREQ and RD signals low. In response to MREQ and RD signals, signal E is made low. In response to the address data "7000", read, write and opcode address decoder 121, 123 and 125 make signals A, B and C high.

In response to a low signal E and a high signal A, negative AND gate 131 makes signal K low. Signals I and J remain high. In response to a low signal C and high signals A and b, negative OR gate 153 makes signal G low. Signal H remains high.

In response to a low signal G, current address data latch 155 latches the address data on address bus 39. Opcode address data latch 151, however, fails to latch the data and holds the data in response to a high signal H.

In response to signal K, F/F 133 is reset so that negative OR gate 147 makes signal L low. CPU 31 is interrupted in response to a low signal L. When CPU 31 is interrupted, CPU 31 operates in accordance with the interruptions routine shown in FIG. 10. In accordance with the present program coding, CPU 31 operates in the read mode when the interruption takes place. CPU 31 thus reads and stores the data described above.

Figure 16:
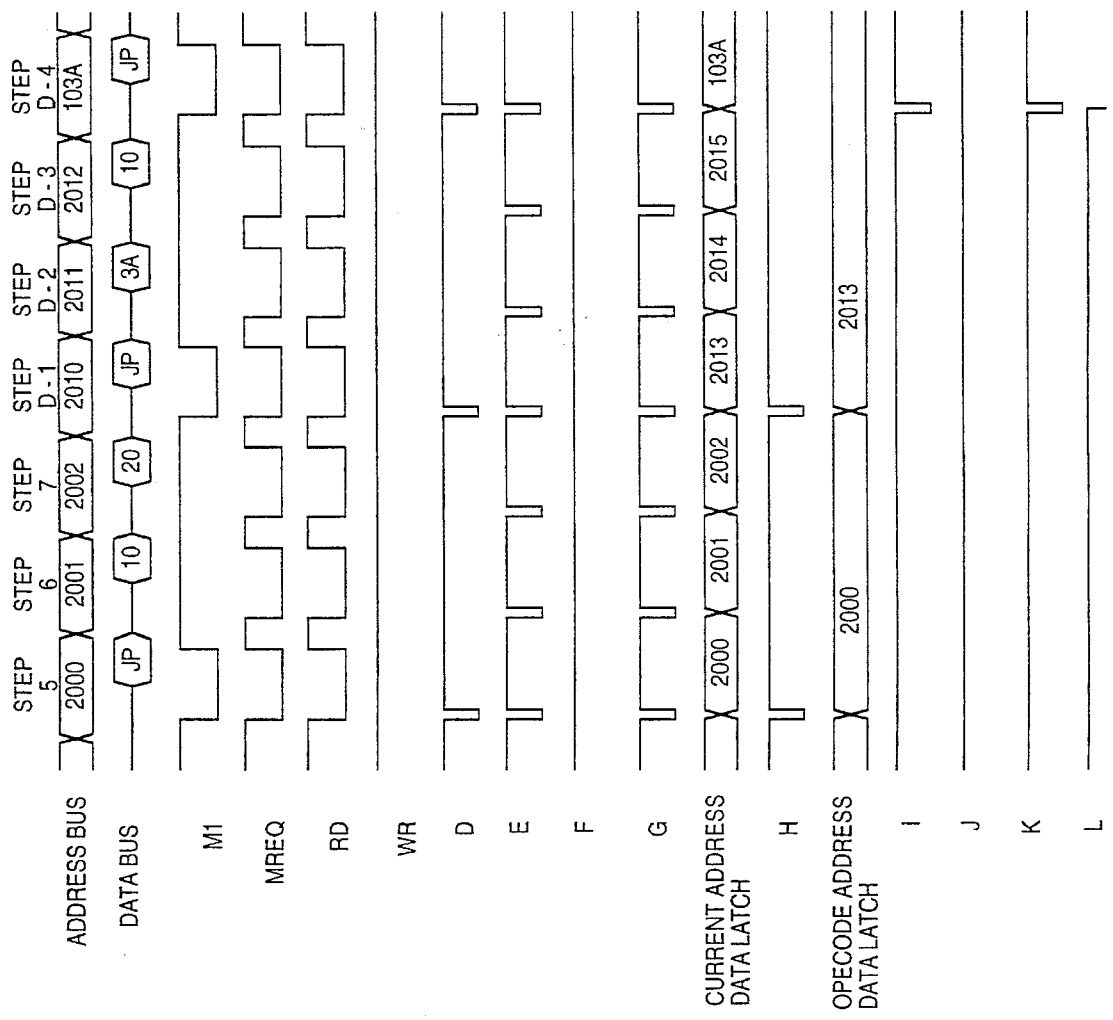
FIG. 16 shows the waveform of signals generated by the CPU shown in FIG. 3 operating in accordance with the program shown in FIG. 15.

Referring now to FIGS. 15 and 16, a fourth example of the user program coding is explained. The difference between the first and fourth example of the user program codings is in the step returning back to the source step.

In step D-1 after steps 5, 6 and 7, CPU 31 moves into the step indicated by the address 2010 (Hex).

CPU 31 executes the opcode fetch cycle first and then sends the address data 2010 (Hex) and makes M1, MREQ, and RD signals low. In response to low M1, MREQ and RD signals, CPU 31 stores the opcode "JP" inside.

In steps D-2 and D-3 after step D-1, CPU 31 reads the lower and the upper 8 bits of the address data following the opcode "JP" stored in EPROM 33.

In step D-4 after step D-3, CPU 31 executes the opcode fetch cycle indicated by the address data 103A (Hex).

At first CPU 31 sends the address data 103A (Hex) onto address bus 39. Then CPU 31 fetches the opcode "JP". CPU 31, however, is interrupted as explained below.

In response to the address data 103A (Hex), read, write and opcode address decoder 121, 123 and 125 of supervising device 45 makes signals A, B and C high. In the opcode fetch cycle, CPU 31 makes M1, MREQ, and RD signals low. In response to M1, MREQ, and RD signals, access signal circuit 127 makes signals D and E low and signal F high. In response to a high signal A and a low signal E, negative AND gate 131 makes signal K low. In response to a high signal B and a high signal F, negative AND gate 137 keeps signal J high. In response to a high signal C and a low signal D, negative AND gate 143 makes signal I low and negative AND gate 147 makes signal H high. In response to signals A, B and C, negative OR gate 153 makes signal G low.

In response to low signals I and K, F/Fs 133 and 145 are reset and output a low signal. In response to the signal from F/Fs 133 and 145, negative OR gate 147 makes signal L low and CPU 31 is interrupted.

In response to a low signal G, current address data latch 155 latches the data on address bus 39. In response to a high signal H, opcode address data latch 151 fails to latch the data and hold the old data.

When CPU 31 is interrupted, CPU 31 operates in accordance with the interrupting routine shown in FIG. 10. In accordance with the present program coding, CPU 31 operates in the opcode fetch mode when the interruption takes place. CPU 31, however, goes back to the basic program under the "JP" opcode, not under the "RET" opcode. CPU 31 fails to change the data stored in the stack pointer when going back to the basic program. That is, the stack pointer retains the data "60FD" when CPU 31 goes back to the basic program. When CPU 31 is interrupted, CPU 31 must decrease the content of the stack pointer, i.e., "60 FB". So, CPU 31 goes to step P-4 shown in FIG. 10.

Other objects, features and advantages of the present invention will become apparent from the above detailed description. It should be understood, however, that the detailed description and specific examples while indicating preferred embodiments of the invention, are given by way of illustrations only, since various changes and modifications within the spirit and scope of the invention will become apparent to those skilled in the art.

I claim:

1. A portable electronic device comprising:

a body;

memory means including,
    first storage means for storing a first program, said first program comprising a plurality of first instructions,
    second storage means for storing a second program, said second program comprising a plurality of second instructions;

chip means, mounted in said body and coupled to said memory means, for reading and executing said first and second instructions of said first and second programs stored by said first and second storage means, said chip means including address means for outputting address data indicating a memory location in said memory means where said chip means accesses data, said chip means performing a read operation for reading, a write operation for writing, and a code fetch operation for fetching a code indicating one of said first or second instructions;

supervising means, coupled to said chip means and said memory means, for determining whether said first or second instructions read from said first or second programs by said chip means addresses a portion of said memory means occupied by the other of said first or second programs and generating an interrupt signal in response to such a determination, wherein said supervising means further comprises:
    first means for distinguishing said code fetch operation from said read and write operation,
    second means for generating a code signal in response to said first means distinguishing said code fetch operation from said read and write,
    third means for determining whether said address data outputted by said chip means is addressed to said portion of said memory containing an other of said first and second programs than is in use at the time of determination, and
    fourth means, coupled to said third means, for generating an address distinguishing signal in response to said third means determining whether said address data outputted by said chip means is addressed to said portion of said memory containing an other of said first and second programs than is in use at the time of determination, and wherein said chip means is interrupted by said interrupt signal generated by said supervising means.

2. The card of claim 1, wherein said supervising means further comprises;

fifth means, coupled to said fourth means and said second means for generating said interrupt signal in response to said code signal and said address distinguishing signal.

3. A method for executing program instructions in accordance with a first program stored in a first memory, and including a plurality of instructions and a second program stored in a second memory and including a plurality of instructions, said method comprising the steps of:

reading said program instructions included in said first and second programs;

executing said program instructions:

determining whether said program instructions read from said first program or said second program by said reading step relates to the other of said first program or said second program;

generating an interrupt signal in accordance with the determining result;

interrupting said executing step in accordance with the interrupt signal, wherein said executing step includes the steps of:

outputting address data;

outputting address data indicating a memory, address location of the program instruction which caused said interrupt signal;

reading/writing data; and fetching a code indicating said first and second program instructions;

wherein said determining step includes the steps of:

distinguishing said fetching step from other steps;

generating a code signal in response to said distinguishing step;

determining whether the address data output by said output step indicates the other of said first and second programs which is different from the program used at the current time; and generating an address distinguishing signal in response to the determined result.

4. The method of claim 3, wherein said interrupt signal generating step includes the step of generating the interrupt signal in response to the code signal and the address distinguishing signal.

5. A data processing system comprising:

first storage means for storing first data;

second storage means for storing a first program, said first program including a plurality of first instructions, said first instructions accompanying second data for addressing;

microprocessor means for accessing said first instructions and executing said first instructions, said microprocessor means supplying said second data as address data to said first storage means or said second storage means;

supervising means, coupled to said microprocessor means, for receiving said second data and determining whether said second data indicates a predetermined area of said first storage means in which said first data is stored;

means for identifying an access type when said first storage means is accessed;

interrupt signal generating means, coupled to said supervising means, for generating an interrupt signal in response to said access type identified by said identifying means and a determination by said supervising means that said second data indicates said predetermined area of said first storage means and outputting said interrupt signal to said microprocessor means; and interrupt means, coupled to said interrupt signal generating means, for receiving said interrupt signal and stopping an access operation of said microprocessor means in response to said interrupt signal;

wherein said first storage means further stores a second program, said second program comprising a plurality of second instructions, and wherein said supervising means determines whether said first or second instructions read from said first or second programs addresses a portion of said first or second storage means occupied by the other of said first or second programs and said interrupt means generates an interrupt signal in response to a determination by said supervising means that said first or second instructions read from said first or second programs addresses a portion of said first or second storage means occupied by the other of said first or second programs and outputs said interrupt signal to said microprocessor means.

6. A method for controlling access by processing means to first storage means, provided in a device, for storing predetermined data and to user programmable second storage means, provided in said device, for storing a plurality of instructions, said processing means including an interrupt input to receive an interrupt signal for interrupting an operation of said processing means, said predetermined data and said instructions being designated by first address data, said predetermined data being stored in said first storage means before issuing said device, said instructions being stored by a user after issuing said device, and wherein said processing means further comprises means for writing data into said first storage means, and means for supplying second address data and a write signal to said first storage means when said processing means writes data into said first storage means, the method comprising the steps of:

first supplying said first address data to said first storage means from said processing means;

first accessing, by said processing means, said second storage means to read said instructions, said instructions accompanying said second address data;

second supplying said second address data accompanied by said instructions to said first storage means or said second storage means;

second accessing, by said processing means, said first storage means or said second storage means in response to said second address data supplied by said second supplying step;

determining whether said second address data, accompanied by said instructions, indicates a predetermined area of said first storage means in response to said second address data supplied in said second supplying step;

stopping the supply of said write signal to said first storage means in response to said determining step;

identifying an access type when said second storage means is accessed;

generating an interrupt signal in response to said access type identified by said identifying step and a determination in said determining step that said second address data indicates said predetermined area of said first storage means in which said first data is stored; and outputting said interrupt signal to said interrupt input of said processing means so said operation of said processing means is interrupted.

7. A data processing system comprising:

first storage means for storing first data, said first storage means further including:
- a first area wherein a user can only read dam;
- a second area wherein said user can read and write data; and
- a third area wherein said user is able to read or write data;

second storage means for storing a program, said program including a plurality of first instructions, said first instructions accompanying second data for addressing;

microprocessor means for accessing said first instructions and executing said first instructions, said microprocessor means supplying said second data as address data to said first storage means or said second storage means;

supervising means, coupled to said microprocessor means, for receiving said second data and determining whether said second data indicates a predetermined area of said first storage means in which said first data is stored, said supervising means further including:
- means for detecting an operation mode of said microprocessor means; and
- means for determining whether said second data indicates one of said first, second, or third area of said first storage means;
- means for identifying an access type when said first storage means is accessed;
- interrupt signal generating means, coupled to said supervising means, for generating an interrupt signal in response to said access type identified by said identifying means and a determination by said supervising means that said second data indicates said predetermined area of said first storage means and outputting said interrupt signal to said microprocessor means; and
- interrupt means, coupled to said interrupt signal generating means, for receiving said interrupt signal and stopping an access operation of said microprocessor means in response to said interrupt signal.

8. A data processing system comprising:

first storage means for storing first data;

second storage means for storing a program, said program including a plurality, of first instructions, said first instructions accompanying second data for addressing:

microprocessor means for accessing said first instructions and executing said first instructions, said microprocessor means supplying said second data as address data to said first storage means or said second storage means;

supervising means, coupled to said microprocessor means, for receiving said second data and determining whether said second data indicates a predetermined area of said first storage means in which said first data is stored;

means for identifying an access type when said first storage means is accessed;

interrupt signal generating means, coupled to said supervising means, for generating an interrupt signal in response to said access type identified by said identifying means and a determination by said supervising means that said second data indicates said predetermined area of said first storage means and outputting said interrupt signal to said microprocessor means; and interrupt means, coupled to said interrupt signal generating means, for receiving said interrupt signal and stopping an access operation of said microprocessor means in response to said interrupt signal, and wherein said microprocessor means further comprises:
- means for writing data into said first storage means, and means for supplying said second data and a write signal to said first storage means when said microprocessor means writes data into said first storage means; and
- gate means for stopping the supply of said write signal to said first storage means in response to said determination by said supervising means.

9. A data processing apparatus comprising:

first storage means for storing first data describing a first program;

second storage means for storing second data describing a second program, which is storable by a user, the second program comprising a plurality of instructions, the instructions accompanying address data;

microprocessor means for accessing the first data stored in said first storage means and operating in accordance with the first program, or the second data stored in said second storage means and operating in accordance with the second program, said microprocessor means supplying the address data to said first storage means or said second storage means;

first generating means for generating information regarding a data access to be performed by said microprocessor means;

supervising means, coupled to said microprocessor means, for receiving the second data and determining whether the second data indicates a predetermined area of said first storage means in which the first data is stored;

means, responsive to the information generated by said first generating means, for identifying an access type associated with the data access to be performed by said microprocessor means;

interrupt signal generating means, coupled to said supervising means, for generating an interrupt signal in response to the access type identified by said identifying means and a determination by said supervising means that the second data indicates the predetermined area of said first storage means;

interrupt means, coupled to said interrupt signal generating means, for receiving the interrupt signal and stopping the data access by said microprocessor means in response to the interrupt signal;

second generating means for generating first information indicating an opcode access mode, second information indicating read access mode, and third information indicating a write access mode responsive to said first generating means:

bus means; and latch means, coupled to said bus means and responsive to said supervising means and said identifying means, for latching the address data.

* * * * *